United States Patent
Wu et al.

(10) Patent No.: US 10,146,881 B2
(45) Date of Patent: Dec. 4, 2018

(54) SCALABLE PROCESSING OF HETEROGENEOUS USER-GENERATED CONTENT

(71) Applicant: LinkedIn Corporation, Mountain View, CA (US)

(72) Inventors: Bin Wu, Palo Alto, CA (US); Weiqin Ma, San Jose, CA (US); Weidong Zhang, San Jose, CA (US); Liwen Zhang, San Carlos, CA (US); Srihari R. Duddukuru, San Jose, CA (US); SangHyun Park, Fremont, CA (US); Yongzheng Zhang, San Jose, CA (US); Yi Zheng, Cupertino, CA (US); Hong Lu, Fremont, CA (US); Yurong Shi, San Jose, CA (US); Chi-Yi Kuan, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 222 days.

(21) Appl. No.: 15/136,502

(22) Filed: Apr. 22, 2016

(65) Prior Publication Data

US 2017/0286551 A1    Oct. 5, 2017

Related U.S. Application Data

(60) Provisional application No. 62/314,827, filed on Mar. 29, 2016.

(51) Int. Cl.
*G06F 17/30* (2006.01)
*G06F 7/00* (2006.01)
*G06F 17/24* (2006.01)

(52) U.S. Cl.
CPC ...... *G06F 17/30867* (2013.01); *G06F 17/248* (2013.01); *G06F 17/30539* (2013.01)

(58) Field of Classification Search
CPC ............ G06F 17/30867; G06F 17/248; G06F 17/30539

(Continued)

(56) References Cited

U.S. PATENT DOCUMENTS

| | | | |
|---|---|---|---|
| 7,024,431 B1 | 4/2006 | Komelson et al. | |
| 8,527,544 B1 * | 9/2013 | Colgrove | G06F 3/0608 707/791 |

(Continued)

OTHER PUBLICATIONS

"Apache Hadoop 2A.1", https://hadoop.apache.org/docs/r2.4.1/.

(Continued)

*Primary Examiner* — Kuen S Lu
(74) *Attorney, Agent, or Firm* — Park, Vaughan, Fleming & Dowler LLP; Chia-Hsin Suen

(57) ABSTRACT

The disclosed embodiments provide a system for processing data. During operation, the system obtains a first configuration for processing a first set of content items from a first data source and a second configuration for processing a second set of content items from a second data source. For each content item in the first set of content items, the system uses mappings from the first configuration to transform original fields from the content item into required fields in a record representing the content item. Next, the system generates, from the required fields, a document key for the content item. The system also performs deduplication of multiple records with the document key and stores a single record with the document key. Finally, the system uses the second configuration to generate, from the second set of content items, a set of records independently of processing the first set of content items.

19 Claims, 5 Drawing Sheets

(58) Field of Classification Search
USPC .......................................................... 707/692
See application file for complete search history.

(56) References Cited

U.S. PATENT DOCUMENTS

| | | |
|---|---|---|
| 2013/0003965 A1 | 1/2013 | Wilkinson et al. |
| 2013/0046949 A1 | 2/2013 | Colgrove et al. |
| 2013/0104251 A1* | 4/2013 | Moore .................. G06F 21/602 726/30 |
| 2014/0189483 A1 | 7/2014 | Kwan et al. |
| 2017/0235786 A9* | 8/2017 | Faith ................. G06F 17/30377 707/607 |
| 2017/0286551 A1* | 10/2017 | Wu ................... G06F 17/30867 |

OTHER PUBLICATIONS

"Voice of the Customer", http://npd-solutions.com/voc.html.
"Voice of the Customer VoC Software & Programs Confirmit", https://www.confirmit.com/what-we-do/voice-of-the-customer/.
"Non Final Office Action Issued in U.S. Appl. No. 14/954,303", dated Jul. 6, 2018, 19 Pages.

* cited by examiner

SCALABLE PROCESSING OF HETEROGENEOUS USER-GENERATED CONTENT

RELATED APPLICATION

This application claims the benefit of U.S. Provisional Application No. 62/314,827, entitled "Scalable Processing of Heterogeneous User-Generated Content," by inventors Bin Wu, Weiqin Ma, Weidong Zhang, Liwen Zhan, Srihari R. Duddukuru, SangHyun Park, Yongzheng Zhang, Yi Zheng, Hong Lu, Yurong Shi and Chi-Yi Kuan, filed 29 Mar. 2016, which is incorporated herein by reference.

BACKGROUND

Field

The disclosed embodiments relate to text analytics. More specifically, the disclosed embodiments relate to techniques for performing scalable processing of heterogeneous user-generated content.

Related Art

Analytics may be used to discover trends, patterns, relationships, and/or other attributes related to large sets of complex, interconnected, and/or multidimensional data. The discovered information may then be used to gain insights and/or guide decisions and/or actions related to the data. For example, business analytics may be used to assess past performance, guide business planning, and/or identify actions that may improve future performance.

In particular, text analytics may be used to model and structure text to derive relevant and/or meaningful information from the text. For example, text analytics techniques may be used to perform tasks such as categorizing text, identifying topics or sentiments in the text, determining the relevance of the text to one or more topics, assessing the readability of the text, and/or identifying the language in which the text is written. In turn, text analytics may be used to mine insights from large document collections, which may improve understanding of content in the document collections and reduce overhead associated with manual analysis or review of the document collections.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
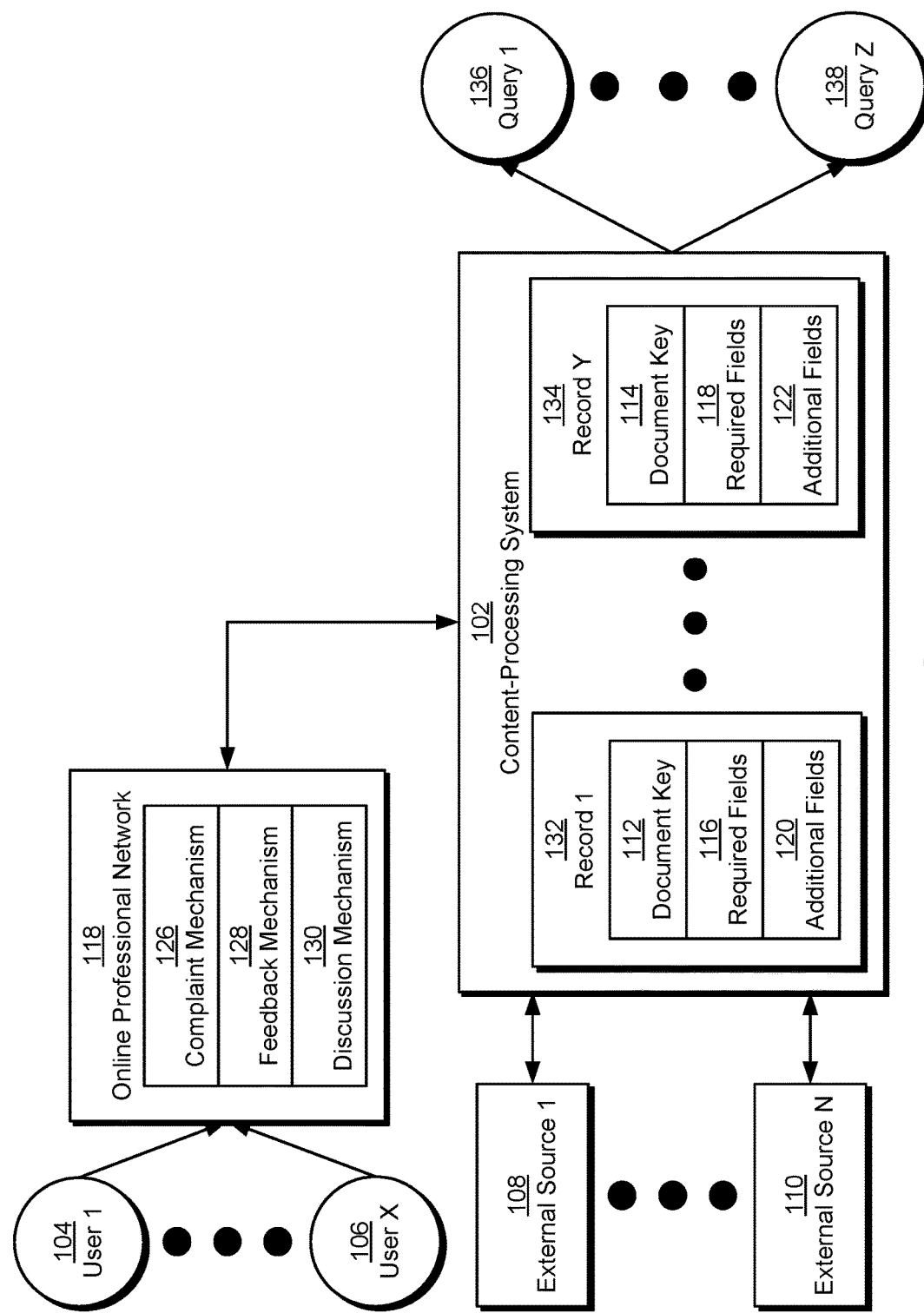
FIG. 1 shows a schematic of a system in accordance with the disclosed embodiments.

The disclosed embodiments provide a method, apparatus, and system for processing data. More specifically, the disclosed embodiments provide a method, apparatus, and system for performing template-based processing of heterogeneous user-generated content. As shown in FIG. 1, the content may be obtained from a set of users (e.g., user 1 104, user X 106) of a social network such as an online professional network 118. Online professional network 118 may allow the users to establish and maintain professional connections, list work and community experience, endorse and/or recommend one another, and/or search and apply for jobs. Employers and recruiters may use online professional network 118 to list jobs, search for potential candidates, and/or provide business-related updates to users.

As a result, content items associated with online professional network 118 may include posts, updates, comments, sponsored content, articles, and/or other types of unstructured data transmitted or shared within the online professional network. The content items may additionally include complaints provided through a complaint mechanism 126, feedback provided through a feedback mechanism 128, and/or group discussions provided through a discussion mechanism 130 of online professional network 118. For example, complaint mechanism 126 may allow users to file complaints or issues associated with use of the online professional network. Similarly, feedback mechanism 128 may allow the users to provide scores representing the users' likelihood of recommending the use of the online professional network to other users, as well as feedback related to the scores and/or suggestions for improvement. Finally, discussion mechanism 130 may obtain updates, discussions, and/or posts related to group activity within the online professional network from the users.

Content items related to use of online professional network 118 may also be obtained from a number of external sources (e.g., external source 1 108, external source N 110). For example, user feedback regarding the online professional network may be obtained periodically (e.g., daily) and/or in real-time from reviews posted to review websites, third-party surveys, other social media websites or applications, and/or external forums. Content items from both online professional network 118 and the external sources may be stored in a database, data warehouse, cloud storage, and/or other data-storage mechanism for subsequent retrieval and use.

In one or more embodiments, the content items include text input from users and/or text that is extracted from other types of data. As mentioned above, the content items may include posts, updates, comments, sponsored content, articles, and/or other text-based user opinions or feedback for a product such as online professional network 118. Alternatively, the user opinions or feedback may be provided in images, audio, video, and/or other non-text-based content items. A speech-recognition technique, optical character recognition (OCR) technique, and/or other technique for extracting text from other types of data may be used to convert such types of content items into a text-based format.

Because the content items represent user opinions, issues, and/or sentiments related to online professional network 118, information in the content items may be important to improving user experiences with the online professional network and/or resolving user issues with the online professional network. However, the content items may contain a large amount of unstructured, semi-structured, and/or heterogeneous data, which may preclude efficient or effective manual review of the data by developers and/or designers. For example, user-generated content related to online professional network 118 may contain millions of content items, which may be impossible to read in a timely or practical manner by a significantly smaller number of developers and/or designers.

Moreover, the aggregation of the content items from different data sources (e.g., complaint mechanism 126, feedback mechanism 128, discussion mechanism 130, external sources, etc.) may result in differences in the formatting, layout, or schemas of data across the data sources, which may further interfere with automated processing or analysis of the content. For example, a customer support ticket received through complaint mechanism 126 may include fields such as a ticket identifier, title of the complaint, content of the complaint, product associated with the complaint, agent handling the complaint, and/or a member identifier of the member filing the complaint. On the other hand, a review from a third-party source of an application for accessing online professional network 118 may include fields such as a title of the review, the content of the review, a rating of the application, and/or a platform of the application. As a result, different processing techniques may be required to extract important information from the customer support ticket and review.

In one or more embodiments, the system of FIG. 1 includes functionality to perform large-scale processing and text mining of heterogeneous user-generated content from online professional network 118, external sources, and/or other data sources. More specifically, a content-processing system 102 may generate a set of standardized records (e.g., record 1 132, record Y 134) from text-based representations of the content items. Each record may include a unique document key (e.g., document keys 112-114), a number of required fields (e.g., required fields 116-118), and a number of additional fields (e.g., additional fields 120-122). As described in further detail below, content-processing system 102 may use a custom configuration for each data source to convert original fields from content items in the data source into required fields in the corresponding records. Content-processing system 102 may also populate the records with additional fields that facilitate subsequent analysis and understanding of the corresponding content, such as words that are found in a blacklist or whitelist, normalized fields for dimensions associated with the content items, user profile data for creators of the content items, and/or text-mining results such as sentiments, topics, categories, and/or relevance scores for the content items.

Because content from each data source is processed using a separate configuration, records may be generated from content items in one data source independently from content items in other data sources. For example, different workflows may be used to perform batch and/or near-realtime processing of content items from different data sources. In turn, the scheduling of each workflow may be adapted to the availability, volume, and/or importance of the content in the corresponding data source. Moreover, changes to the content and/or data sources may be handled by adapting the configurations to the changes instead of requiring manual changes to hard-coded or static scripts that operate on the content.

Content-processing system 102 may then provide the records for use with queries (e.g., query 1 136, query Z 138) associated with the content. For example, content-processing system 102 may enable text-analytics queries that apply filters to the content items; search for the content items by keywords, blacklisted words, and/or whitelisted words; identify common or trending topics or sentiments in the content items; perform classification of the content items; and/or surface insights related to analysis of the content items. Consequently, content-processing system 102 may perform scalable, flexible processing of heterogeneous content in a way that improves the implementation and use of customer-facing solutions, customer support, sales, churn analysis, competitor analysis, public relations, and/or other activities associated with operating online professional network 118 and products offered within the online professional network.

Figure 2:
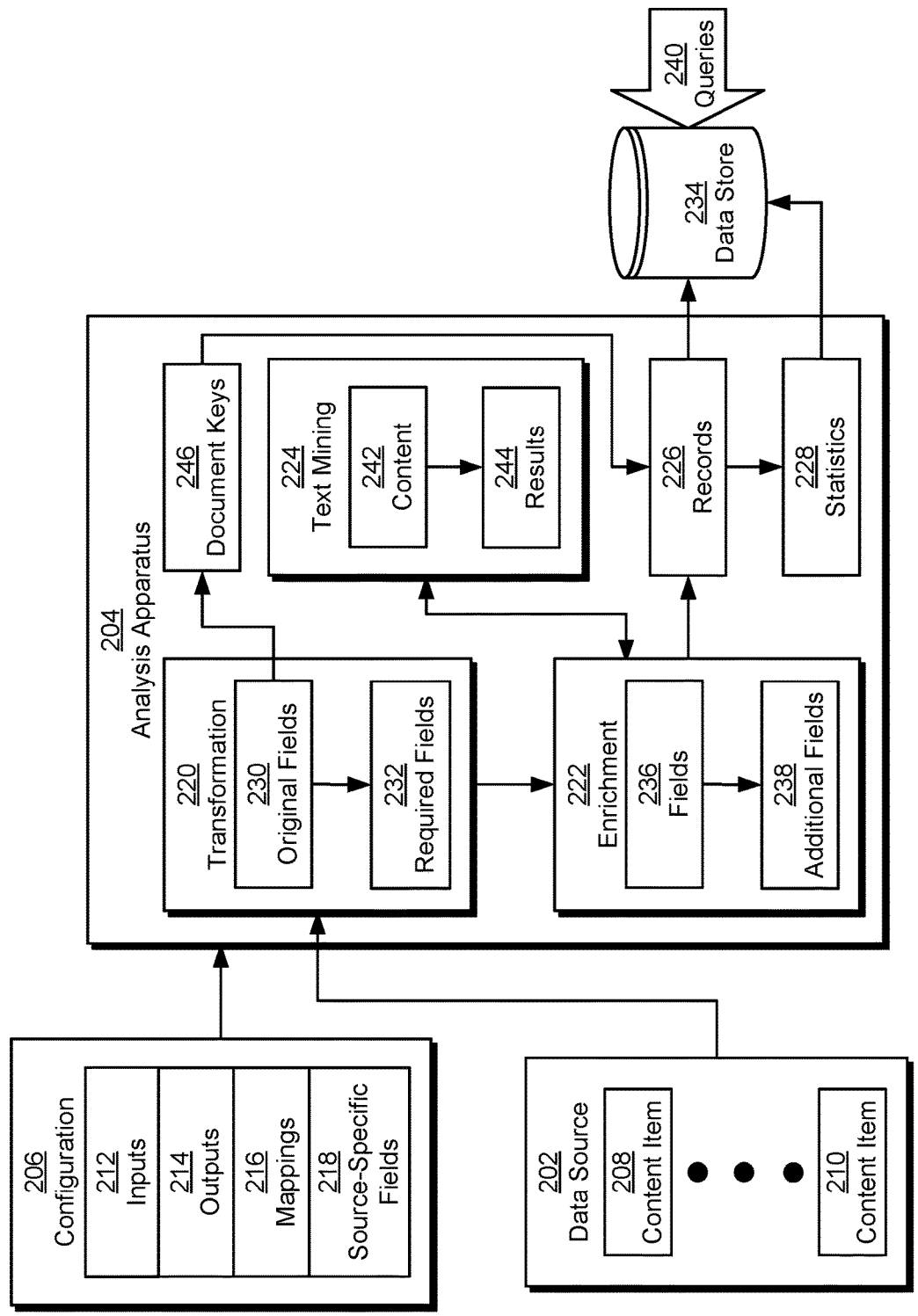
FIG. 2 shows a system for processing heterogeneous user-generated content in accordance with the disclosed embodiments.

FIG. 2 shows a system for processing heterogeneous user-generated content, such as content-processing system 102 of FIG. 1, in accordance with the disclosed embodiments. The system of FIG. 2 includes an analysis apparatus 204 and a data store 234. Each of these components is described in further detail below.

Analysis apparatus 204 may obtain a set of content items 208-210 from a data source 202. For example, analysis apparatus 204 may retrieve text-based representations of user-generated posts, opinions, feedback, reviews, survey responses, complaints, and/or articles from a distributed filesystem, cluster, and/or other network-based storage into which the user-generated content is aggregated. To locate the content items, analysis apparatus 204 may obtain a configuration 206 that specifies one or more inputs 212 containing data source 202. For example, the analysis apparatus may obtain a configuration file that contains a source name and path for each data source containing user-generated content. Because each data source may be dynamically added, removed, or updated by changing a single configuration, changes to the data sources and/or content in the data sources may be easier to apply than data-processing mechanisms that use hard-coded or static scripts to process content.

Next, analysis apparatus 204 may use a set of mappings 216 in configuration 206 to apply a transformation 220 of a set of original fields 230 in each content item into a set of required fields 232 in a record (e.g., records 226) representing the content item. The required fields may contain data that must be present in the record. For example, the required fields may include a source name of data source 202, a date (e.g., date of creation of the content item), a title of the content item, text-based content in the content item, a language of the content item, a location (e.g., country or region) in which the content item was generated, and/or a Uniform Resource Locator (URL) or other identifier for the content item.

Mappings 216 may identify one or more original fields to be included in a corresponding required field. For example, configuration 206 may include a one-to-one mapping of a "source name" field in the content item to a corresponding "source name" field in the record. Alternatively, configuration 206 may specify a mapping that transforms or normalizes the "source name" field in the content item and/or concatenates the field with a different field in the content item to produce the "source name" field in the record. One or more required fields may optionally be set to null values by mappings 216 (e.g., when the corresponding original fields are not available in the content item) and/or when the values of the corresponding original fields are null.

Analysis apparatus 204 may also obtain a set of source-specific fields 218 from configuration 206 and include the values of the source-specific fields in the record. For example, analysis apparatus 204 may include, in the record, source-specific fields that describe data source 202 and/or the context in which the content item was created or provided through the data source.

After required fields 232 and/or source-specific fields 218 are generated for the content item, analysis apparatus 204 may generate a unique document key (e.g., document keys 246) for the corresponding record from one or more of the fields. For example, the analysis apparatus may produce the document key as a concatenation and/or hash of a source name, date, title, content, language, country, URL, and/or other required fields for the content item. Document keys for content from different data sources may also be generated in different ways. For example, configuration 206 may specify that a document key for a content item from a specific data source be generated from fewer fields, more fields, and/or a different operation on the fields.

Analysis apparatus 204 may use document keys 246 to perform deduplication of content items from data source 202 and/or other data sources. When two or more content items produce the same document key, analysis apparatus 204 may merge multiple records (e.g., records 226) for the content items into a single record and/or otherwise eliminate copies of the same fields in the records.

Analysis apparatus 204 may further perform an enrichment 222 of existing fields 236 in the record with additional fields 238 containing data related to the existing fields. First, analysis apparatus 204 may match words from the content item and/or existing fields to a whitelist or blacklist of significant words or phrases. The whitelist may contain words or phrases that are important or relevant to analysis or text mining of content from data store 202. For example, the whitelist may include text that is related to insights, launches, events, themes, public relations, marketing campaigns, brand, value, employment, strategy, financial performance, and/or news for a product, company, or other entity. Conversely, the blacklist may contain words or phrases that are unimportant or irrelevant to analysis or text mining of the content. Continuing with the previous example, the blacklist may include text for identifying generic status updates, connection requests, self-promotional content, spam, and/or other content that mentions the product, company, or entity without providing substantive information related to the product, company, or entity.

Any words from the existing fields and/or content item that are found in the blacklist or whitelist may be included in a respective "blacklisted words" or "whitelisted words" field in the record. Similarly, flags representing a "whitelisted status" (i.e., when the content item contains whitelisted words) and/or a "blacklisted status" (i.e., when the content item contains blacklisted words) may be updated accordingly. By adding metadata related to blacklisting or whitelisting of the content item to the record, analysis apparatus 204 may perform lossless processing that facilitates subsequent analysis or querying of the record instead of lossy dropping of blacklisted records or fields in the records.

Second, analysis apparatus 204 may match the content item to a user profile and include one or more attributes from the user profile in additional fields 238. For example, the content item may be linked to a user of an online professional network, such as online professional network 118 of FIG. 1. If the user's identity with the online professional network can be determined from or is included with the content item, the user's number of connections, member segment, industry, company, seniority, occupation, and/or other information from the user's profile with the online professional network may be included in additional fields 238.

Third, analysis apparatus 204 and/or other components of the system may perform text mining 224 of content 242 in the content item and include results 244 of the text mining in additional fields 238. For example, the components may analyze sentiment (e.g., positive, negative, neutral, unknown), relevance (e.g., relevant or irrelevant), and/or topics in the content. The components may also classify the content using categories such as products offered within the online professional network (e.g., sales products, marketing products, advertising products, recruiting products, etc.), value propositions related to use of online professional network 118 (e.g., hiring/marketing/selling, staying informed, networking, getting hired, connecting, etc.), and/or themes or usage contexts (e.g., product feedback, self-promotion, and/or connecting with other users) associated with the content items. Labels, scores, tags, categories, and/or other results 244 of the analysis may then be converted into additional fields 238 in the record.

After transformation 220, enrichment 222, and text mining 224 have been applied to the content item, analysis apparatus 204 may store the resulting record in data store 234 according to one or more outputs 214 specified in configuration 206. For example, the analysis apparatus may obtain an output path for the record from the configuration and store the record in a directory, database, distributed filesystem, network-attached storage (NAS), and/or other storage location represented by the output path. The analysis apparatus may optionally store intermediate output, audit data, and/or other results of processing the content item in directories or locations represented by one or more additional outputs 214 from configuration 206, when such outputs are specified.

The data store may then be used to process queries 240 against the stored data. For example, the data store and/or another component of the system may include a graphical user interface (GUI), command-line interface (CLI), application-programming interface (API), and/or other type of interface for extracting a subset of records that match queries 240 from the data store.

Analysis apparatus 204 may additionally generate a set of statistics 228 related to processing of content items into records. For example, analysis apparatus 204 may calculate statistics related to data volume (e.g., number of content items from each data source or all data sources, size of the content items, etc.), whitelisting (e.g., percentage of records that are whitelisted), blacklisting (e.g., percentage of records that are blacklisted), deduplication (e.g., amount or percentage of deduplicated records), aggregate sentiment (e.g., percentage of records with positive, negative, neutral, or unknown sentiment), classification (e.g., amount or percentage of classified records, breakdown of classified records into categories, etc.), relevance (e.g., amount or percentage of records that are labeled as relevant or irrelevant), and/or other attributes associated with the content items and/or corresponding records. Such statistics may be calculated on a periodic (e.g., hourly, daily, etc.) basis, when a workflow for processing a batch of content items from a data source has finished executing, and/or based on an external trigger (e.g., audit, event, or user request). Analysis apparatus 204 may then store the statistics in data store 234 and/or a separate data store for subsequent querying, outputting, reporting, visualization, and/or other use by other components.

Those skilled in the art will appreciate that the system of FIG. 2 may be implemented in a variety of ways. First, data repository 234 and analysis apparatus 204 may be provided by a single physical machine, multiple computer systems, one or more virtual machines, a grid, one or more databases, one or more filesystems, and/or a cloud computing system. Instances of analysis apparatus 204 and/or data store 234 may additionally be scaled to the volume of content, the number of data sources, and/or the frequency, speed, or latency of processing the content.

Second, the functionality of analysis apparatus 204 may be adapted to different data sources, types of content, and/or types of analysis. For example, the functionality of analysis apparatus 204 may be implemented by one or more scripts that configure a generic "processing template" to process content items from multiple heterogeneous data sources by inserting values from the corresponding configurations into the template. As a result, the data types, data formats, and/or text-mining techniques to be used in generating a record from a content item may be dynamically adjusted to meet the querying needs associated with the record by modifying the corresponding configuration.

Third, configurations (e.g., configuration 206) for generating records in data store 234 from content in heterogeneous data sources (e.g., data source 202) may be specified in multiple ways. For example, a configuration for each data source may be stored in a separate configuration file, or multiple configurations for multiple data sources may be included in the same configuration file. In another example, data in the configuration files may be formatted as key-value pairs, JavaScript Object Notation (JSON) objects, Extensible Markup Language (XML) documents, property lists, and/or other types of structured data.

Figure 3:
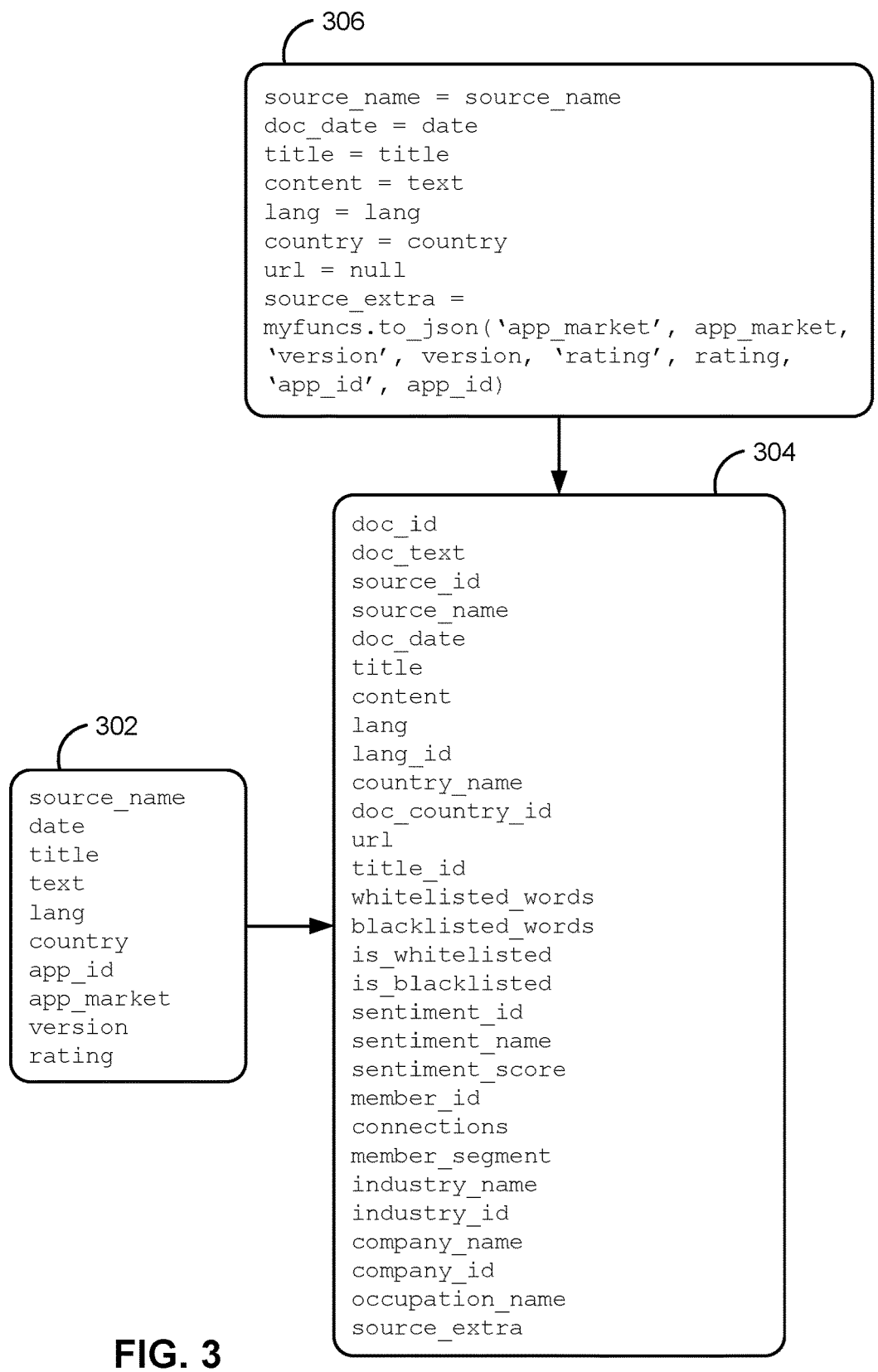
FIG. 3 shows the exemplary processing of a content item into a record representing the content item in accordance with the disclosed embodiments.

FIG. 3 shows the exemplary processing of a content item 302 into a record 304 representing the content item in accordance with the disclosed embodiments. As mentioned above, the content item includes a set of original fields, such as a "source_name", "date", "title", "text", "lang", "country", "app_id", "app_market", "version", and "rating". A configuration 306 associated with the content item and/or the source of the content item may be used to transform and/or enrich the original fields into a larger set of fields in the record.

More specifically, configuration 306 includes mappings of original fields in content item 302 into required fields in record 304. As shown in FIG. 3, the mappings include the names of the required fields (i.e., "source_name", "doc_date", "title", "content", "lang", "country", "url"), followed by the names and/or values of the original fields from which the required fields are to be obtained (i.e., "source_name", "date", "title", "text", "lang", "country", "null"). The first five mappings may identify one-to-one relationships between the required fields and original fields, while the last mapping may set the required "url" field to a null value.

Configuration 306 also indicates an inclusion of source-specific fields from content item 302 in record 304. In particular, the configuration may specify the creation of a "source_extra" field in the record from the source-specific "app_market", "version", "rating", and "app_id" fields in the content item, with the values of the source-specific fields mapped to the original field names within the "source_extra" field.

Configuration 306 may then be used to populate a portion of the fields in record 304 from the original fields in content item 302. More specifically, the record includes the fields of "source_name", "doc_date", "title", "content", "lang", "url", and "source_extra" from the configuration. The record may additionally be uniquely identified by a "doc_id" field containing a document key for the content item, as well as a "doc_text" field containing text from both the "title" and "content" fields. The "title" field may also be used to generate a "title_id" (e.g., as a hash of the "title" field). In turn, the "title_id" field may be used to group and/or subsequently process records of content items with the same title.

The record also includes a number of additional fields containing data related to the content item. First, the record may include "lang_id" and "doc_country_id" fields that identify dimensions that are used in additional processing of the record. For example, the "lang" field (e.g., a language of the content item) may be supplemented with a normalized "lang_id" field (e.g., a numeric ID for the language) for subsequent querying or processing by a frontend and/or other system. Similarly, the "country" field may be transformed into a "country_name" field that standardizes the content of the "country" field (e.g., a country name) and a normalized "doc_country_id" field that enables querying or processing of the record by a corresponding dimension (e.g., a country ID).

Second, the record may include a number of fields that are added after processing and/or analyzing the required and/or source-specific fields. For example, the record may include fields containing whitelisted or blacklisted words in the content item (e.g., "whitelisted_words", "blacklisted_words"), as well as fields that flag the record as whitelisted or blacklisted (e.g. "is_whitelisted", "is_blacklisted"). The record may also include a text-mining result that identifies a sentiment (e.g., "sentiment_id", "sentiment_name") of the content item, as well as a numeric score (e.g., "sentiment score") representing a confidence in the identified sentiment. Finally, the record may include attributes associated with the creator of the content item, such a "member_id", number of "connections", "member_segment", "industry_name", "industry_id", "company_name", "company_id", and/or "occupation_name" from the creator's user profile with an online professional network (e.g., online professional network 118 of FIG. 1).

Figure 4:
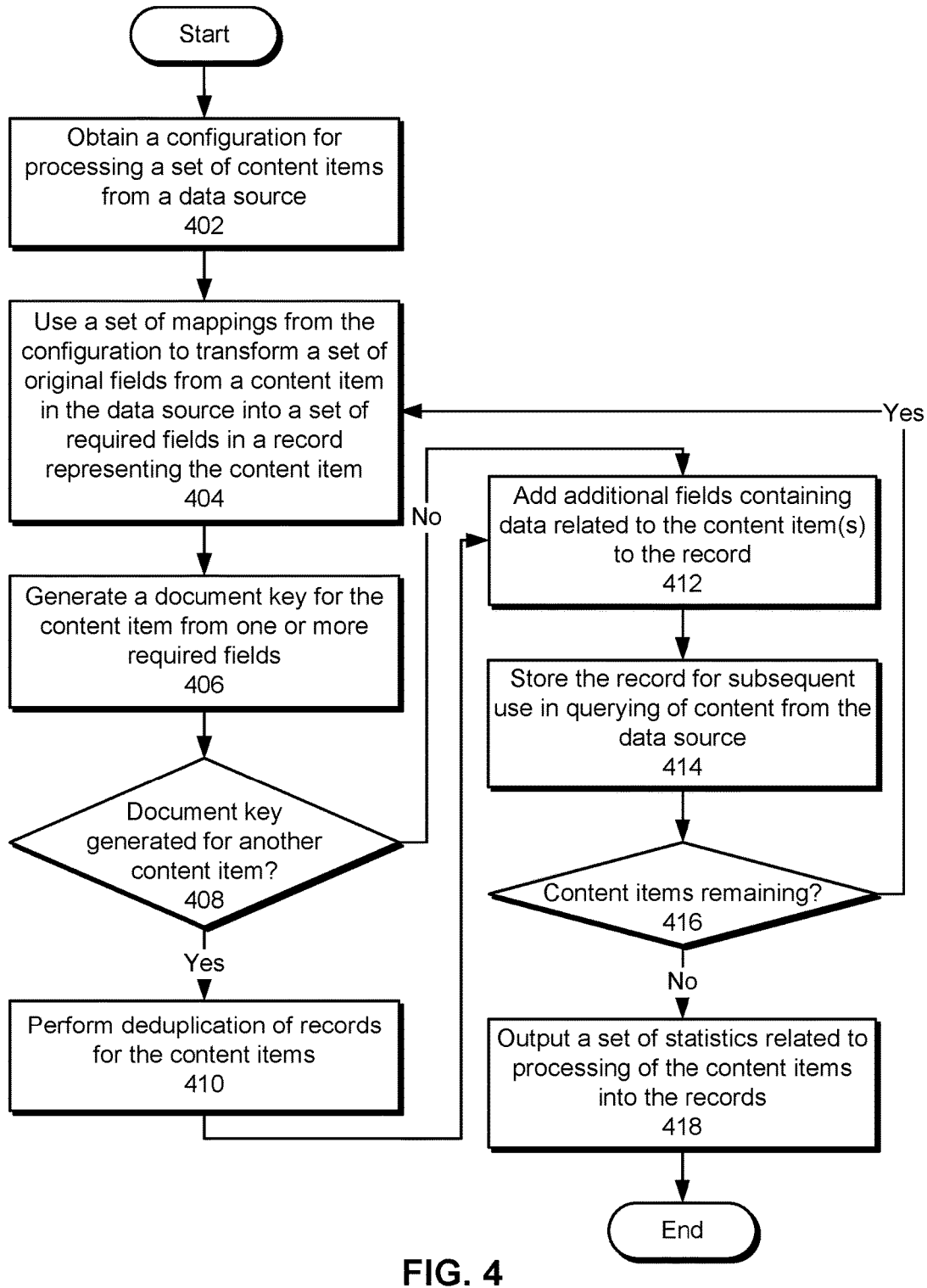
FIG. 4 shows a flowchart illustrating the processing of data in accordance with the disclosed embodiments.

FIG. 4 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a configuration for processing a set of content items from a data source is obtained (operation 402). The configuration may be customized to the location of the data source and/or the types, layout, and formatting of data from the data source. Next, a set of mappings from the configuration is used to transform a set of original fields from a content item in the data source into a set of required fields in a record representing the content item (operation 404). For example, the mappings may be used to copy, concatenate, and/otherwise convert one or more original fields from the content item into a required field in the record. In another example, the required fields may include a source name, date, title, content, language, location, and/or URL for the content item.

A document key for the content item is also generated from one or more required fields (operation 406). For example, the document key may be produced by concatenating, hashing, and/or applying other operations to the required field(s). The same document key may also be generated for another content item (operation 408) from the same data source or a different data source. When the same document key is generated for multiple content items, deduplication of records for the content items is performed (operation 410) by, for example, retaining a single record for the content items. Deduplication of the records is omitted when the document key is not generated for other content items.

After the document key is used to generate a unique record for one or more content items, additional fields containing data related to the content item(s) are added to the record (operation 412). The additional fields may include words from the content item that are found in a whitelist or blacklist of significant words and/or normalized fields for dimensions associated with the content item. When a creator of the content item can be matched to a user profile on a social network, online professional network, and/or other source of demographic or identifying information for the creator, one or more attributes from the user profile (e.g., number of connections, member segment, industry, company, seniority, occupation, etc.) may be included in the additional fields. A number of text-mining techniques may also be applied to the required fields, and results of the text-mining techniques (e.g., sentiments, topics, relevance, products associated with the online professional network, value propositions, etc.) may be included in the additional fields.

The record is then stored for subsequent use in querying of content from the data source (operation 414). For example, the record may be stored in a distributed filesystem, NoSQL database, and/or other storage mechanism for querying or subsequent processing by a user interface, additional analytics tools, users, and/or other components.

Records may be generated from remaining content items (operation 416) from the data source. For example, the records may be generated from the content items on a periodic basis (e.g., hourly, daily, etc.), a near-realtime basis (e.g., as the content items are received in the data source), and/or in response to a trigger or event. Each remaining content item may be processed by including a set of required fields and a document key for the content item in a record for the content item (operations 404-406), performing deduplication using the document key (operations 408-410), adding additional fields to the record (operation 412), and storing the record (operation 414).

After processing of content items from the data source is complete, a set of statistics related to processing of the content items into the records is outputted (operation 418). For example, the statistics may specify amounts and/or percentages related to the relevance, sentiment, classification, whitelisting, blacklisting, deduplication, and/or other attributes of the records. The statistics may be merged with statistics for content items from other data sources and/or displayed separately from statistics for the other data sources.

Moreover, operations 402-418 may be independently applied to content from multiple data sources to generate records and statistics from the content. For example, a separate configuration may be adapted to the layout, formatting, and/or types of data in each data source. Multiple workflows may then be scheduled and executed to process content from the data sources using the corresponding configurations according to different schedules, intervals, and/or triggers. Each workflow may obtain a set of values from the corresponding configuration and insert the first set of values into a separate instance of a generic processing template. The workflow may then use the instance to independently process content items from the data source specified in the configuration without requiring manual modification of the processing template.

Figure 5:
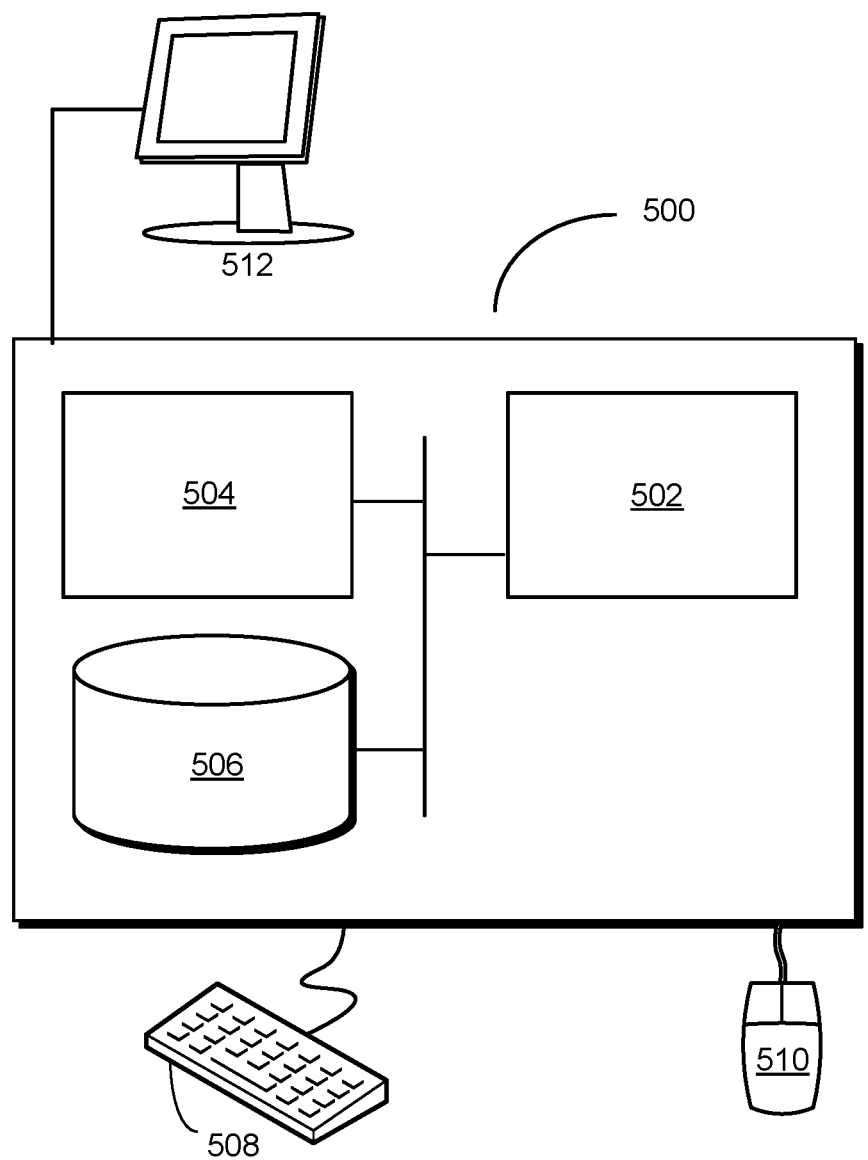
FIG. 5 shows a computer system in accordance with the disclosed embodiments.

FIG. 5 shows a computer system 500. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing data. The system may include an analysis apparatus that obtains a first configuration for processing a first set of content items from a first data source. For each content item in the first set of content items, the analysis apparatus may use a set of mappings from the first configuration to transform a set of original fields from the content item into a set of required fields in a record representing the content item. Next, the analysis apparatus may generate, from one or more of the required fields, a document key for the content item. When the document key is generated for another content item, the analysis apparatus may perform deduplication of the record and another record for the other content item. The system may also include a storage mechanism that stores the record for use in subsequent querying of content from the first data source.

The analysis apparatus may also obtain a second configuration for processing a second set of content items from a second data source. Next, the analysis apparatus may use the second configuration to generate, from the second set of content items, a second set of records for use in subsequent querying of content from the second data source independently of processing the first set of content items from the first data source. Finally, the storage mechanism may store the second set of records for use in subsequent querying of content from the second data source.

In addition, one or more components of computer system 500 may be remotely located and connected to the other components over a network. Portions of the present embodiments (e.g., analysis apparatus, storage mechanism, data sources, etc.) may also be located on different nodes of a distributed system that implements the embodiments. For example, the present embodiments may be implemented using a cloud computing system that obtains heterogeneous user-generated content from a set of remote data sources and converts the content into a set of standardized records for subsequent querying and processing.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    obtaining a first configuration for processing a first set of content items from a first data source and a second configuration for processing a second set of content items from a second data source, wherein the first and second sets of content items have different layouts; and
    for each content item in the first set of content items, processing the content item on one or more computer systems by:
        using a set of mappings from the first configuration to transform a set of original fields from the content item into a set of required fields in a record representing the content item;
        generating, from one or more of the required fields, a document key for the content item;
        when the document key is generated for another content item, performing deduplication of the record and another record representing the other content item;
        adding to the record one or more additional fields comprising data related to the content item, by:
            applying a text-mining technique to one or more of the required fields; and
            including a result of the text-mining technique in the one or more additional fields; and
        storing the record for use in subsequent querying of content from the first data source; and
    using the second configuration to generate, from the second set of content items, a second set of records for use in subsequent querying of content from the second data source independently of processing the first set of content items from the first data source.

2. The method of claim 1, wherein adding the one or more additional fields to the record comprises:
    including, in the record, one or more words from the content item that are found in a whitelist or a blacklist of words.

3. The method of claim 1, wherein adding the one or more additional fields to the record comprises:
    matching the content item to a user profile; and
    including one or more attributes from the user profile in the record.

4. The method of claim 3, wherein the one or more attributes from the user profile comprise at least one of:
    a number of social network connections;
    a member segment;
    an industry;
    a company;
    an occupation; and
    a seniority.

5. The method of claim 1, wherein the result is at least one of:
    a sentiment;
    a topic;
    a relevance;
    a product associated with an online professional network; and
    a value proposition.

6. The method of claim 1, wherein using the second configuration to generate the second set of records independently of processing the first set of content items from the first data source comprises:
    obtaining a first set of values from the first configuration and a second set of values from the second configuration;
    inserting the first set of values into a first instance of a processing template and the second set of values into a second instance of the processing template; and
    using the first and second instances of the processing template to independently process the first and second sets of content items without requiring manual modification of the processing template.

7. The method of claim 6, wherein the first and second sets of content items comprise at least one of:
    a customer survey;
    a complaint;
    a review;
    a group discussion; and
    social media content.

8. The method of claim 1, further comprising:
    outputting a set of statistics related to processing of the first set of content items into a set of records.

9. The method of claim 1, wherein the configuration further comprises:
    one or more inputs;
    one or more outputs; and
    one or more source-specific fields.

10. The method of claim 1, wherein the set of required fields comprises:
    a source name;
    a date;
    a title;
    a content;
    a language;
    a location; and
    a Uniform Resource Locator (URL).

11. The method of claim 1, wherein the record includes at least one supplemental field that supplements at least one required field, wherein the additional field includes information that identifies a dimension used in processing of the record.

12. An apparatus, comprising:
    one or more processors; and
    memory storing instructions that, when executed by the one or more processors, cause the apparatus to:

obtain a first configuration for processing a first set of content items from a first data source and a second configuration for processing a second set of content items from a second data source, wherein the first and second sets of content items have different layouts; and for each content item in the first set of content items:
use a set of mappings from the first configuration to transform a set of original fields from the content item into a set of required fields in a record representing the content item;
generate, from one or more of the required fields, a document key for the content item;
when the document key is generated for another content item, perform deduplication of the record and another record representing the other content item;
add to the record one or more additional fields comprising data related to the content item, by:
applying a text-mining technique to one or more of the required fields; and
including a result of the text-mining technique in the one or more additional fields; and
store the record for use in subsequent querying of content from the first data source; and
use the second configuration to generate, from the second set of content items, a second set of records for use in subsequent querying of content from the second data source independently of processing the first set of content items from the first data source.

13. The apparatus of claim 12, wherein adding the one or more additional fields to the record comprises:
including, in the record, one or more words from the content item that are found in a whitelist or blacklist of significant words.

14. The apparatus of claim 12, wherein adding the one or more additional fields to the record comprises:
matching the content item to a user profile in an online professional network; and
including one or more attributes from the user profile in the record.

15. The apparatus of claim 12, wherein using the second configuration to generate the second set of records independently of processing the first set of content items from the first data source comprises:
obtaining a first set of values from the first configuration and a second set of values from the second configuration;
inserting the first set of values into a first instance of a processing template and the second set of values into a second instance of the processing template; and
using the first and second instances of the processing template to independently process the first and second sets of content items without requiring manual modification of the processing template.

16. The apparatus of claim 12, wherein the record includes at least one supplemental field that supplements at least one required field, wherein the additional field includes information that identifies a dimension used in processing of the record.

17. A system, comprising:
an analysis module comprising a non-transitory computer-readable medium comprising instructions that, when executed, cause the system to:
obtain a first configuration for processing a first set of content items from a first data source and a second configuration for processing a second set of content items from a second data source, wherein the first and second sets of content items have different layouts;
for each content item in the first set of content items:
use a set of mappings from the first configuration to transform a set of original fields from the content item into a set of required fields in a record representing the content item;
generate, from one or more of the required fields, a document key for the content item;
when the document key is generated for another content item, perform deduplication of the record and another record representing the other content item; and
add to the record one or more additional fields comprising data related to the content item, by:
applying a text-mining technique to one or more of the required fields; and
including a result of the text-mining technique in the one or more additional fields; and
use the second configuration to generate, from the second set of content items, a second set of records from the second data source independently of processing the first set of content items from the first data source; and
a storage mechanism comprising a non-transitory computer-readable medium comprising instructions that, when executed, cause the system to store the record for use in subsequent querying of content from the first and second data sources.

18. The system of claim 17, wherein using the second configuration to generate the second set of records independently of processing the first set of content items from the first data source comprises:
obtaining a first set of values from the first configuration and a second set of values from the second configuration;
inserting the first set of values into a first instance of a processing template and the second set of values into a second instance of the processing template; and
using the first and second instances of the processing template to independently process the first and second sets of content items without requiring manual modification of the processing template.

19. The system of claim 17, wherein the record includes at least one supplemental field that supplements at least one required field, wherein the additional field includes information that identifies a dimension used in processing of the record.

* * * * *

UNITED STATES PATENT AND TRADEMARK OFFICE
CERTIFICATE OF CORRECTION

PATENT NO. : 10,146,881 B2
APPLICATION NO. : 15/136502
DATED : December 4, 2018
INVENTOR(S) : Bin Wu et al.

Page 1 of 1

It is certified that error appears in the above-identified patent and that said Letters Patent is hereby corrected as shown below:

On the Title Page

In other publications (at Column 2, Line 61), please delete the phrase, "Apache Hadoop 2A.1" and replace it with the phrase --Apache Hadoop 2.4.1--.

Signed and Sealed this
Twenty-second Day of January, 2019

Andrei Iancu
*Director of the United States Patent and Trademark Office*